(12) United States Patent
Kuribayashi (10) Patent No.: US 7,715,075 B2
(45) Date of Patent: May 11, 2010

(54) OPTICAL BEAM SCANNING APPARATUS AND IMAGE FORMING APPARATUS

(75) Inventor: Yasushi Kuribayashi, Mishima (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 182 days.

(21) Appl. No.: 12/112,311

(22) Filed: Apr. 30, 2008

(65) Prior Publication Data
US 2009/0051996 A1 Feb. 26, 2009

Related U.S. Application Data

(60) Provisional application No. 60/957,688, filed on Aug. 23, 2007.

(51) Int. Cl.
*G02B 26/08* (2006.01)
(52) U.S. Cl. ............... 359/196.1; 359/212.1; 250/234; 347/260
(58) Field of Classification Search ............... None
See application file for complete search history.

(56) References Cited

U.S. PATENT DOCUMENTS 6,194,713 B1 * 2/2001 Kanazawa ............... 250/234

FOREIGN PATENT DOCUMENTS

| JP | 2000-255096 | 9/2000 |
|---|---|---|
| JP | 2002-107645 | 4/2002 |
| JP | 2002-341271 | 11/2002 |
| JP | 2002-341272 | 11/2002 |
| JP | 2003-357778 | 12/2002 |
| JP | 2004-333556 | 11/2004 |
| JP | 2006-215483 | 8/2006 |

\* cited by examiner

*Primary Examiner*—James Phan
(74) *Attorney, Agent, or Firm*—Patterson & Sheridan, LLP (57) ABSTRACT

An optical beam scanning apparatus of the present invention includes a body housing; a light source that emits one or more light fluxes; a pre-deflection optical system; an optical beam deflecting device; a sensor that detects a portion of the light flux deflected by the optical beam deflecting device; a holder base fixed to the body housing by a screw; a rotating holder attached to the holder base and provided with a shaft; a sensor substrate fixed to the rotating holder by a screw, the sensor being fixed to the sensor substrate; a rotation adjusting mechanism that rotationally adjusts the rotating holder around the shaft with respect to the holder base; and a fixing mechanism that fixes the rotating holder to the holder base. With this configuration, it is possible to properly adjust deviation of a recording position while making precise rotational adjustment of a horizontal synchronization sensor.

15 Claims, 8 Drawing Sheets

OPTICAL BEAM SCANNING APPARATUS AND IMAGE FORMING APPARATUS

BACKGROUND OF THE INVENTION

1. Technical Field of the Invention

The present invention relates to an optical beam scanning apparatus and an image forming apparatus equipped with the optical beam scanning apparatus, and more particularly, to an optical beam scanning apparatus which is capable of adjusting deviation of a recording position using a horizontal synchronization sensor, and an image forming apparatus equipped with the optical beam scanning apparatus.

2. Description of the Related Art

Image forming apparatuses employing an electrophotographic method, such as a laser printer, a digital copying machine, a laser facsimile machine and so on, each have an optical beam scanning apparatus for forming an electrostatic latent image on a photoconductive drum by irradiating and scanning a surface of the photoconductive drum with a laser beam (light beam).

In recent years, a tandem color apparatus has been proposed in addition to a monochrome apparatus equipped with a scanning optical system using a single light source, and in addition, a method for use in the tandem color apparatus has been proposed, which increases the number of laser beams to be scanned one time using a plurality of light sources (laser diodes) arranged in a single laser unit for the purpose of increasing the scan speed on a surface of a photoconductive drum (multi-beam method). In the multi-beam method, a plurality of beams for each of color components (for example, yellow, magenta, cyan and black) emitted from each light source are processed to be combined into a single integrated beam in an optical system before deflection, and then the single integrated beam is incident on a polygon mirror. The polygon mirror deflects the incident beam which in turn passes through an fθ lens constituting an optical system after deflection to be separated into beams for respective color components to be irradiated on respective photoconductive drums corresponding to the respective color components.

For an optical system using a light source (LD array) having a plurality of emission points (optical system using a multi-beam method), if a beam-to-beam pitch in a sub-scanning direction on an imaging plane (plane in which a laser beam (light flux) is actually imaged) is set to be a desired value (for example, about 42 µm for 600 dpi and about 21 µm for 1200 dpi), since the emission points have a required distance (deviation) therebetween in a main scanning direction without being arranged in a row in the sub-scanning direction in view of magnification of the optical system, there is a need to adjust a recording position. In the multi-beam method using the light source having the plurality of emission points, as recording timings on image planes of photoconductive drums are deviated from each other, positional deviation of the laser beams scanned on the photoconductive drums occurs in the main scanning direction, which may result in deterioration of image quality due to the positional deviation of the laser beams.

In the prior art, for example, in a scanning optical system using a multi-beam method, a portion of light flux reflected on a deflection surface of a polygon mirror is detected by a horizontal synchronization sensor and is used as a horizontal synchronization adjusting signal in order to align a recording position of lead-off laser beam and respective recording positions corresponding to respective laser beams located with required distance in the main scanning direction from thus recording position (that is, in order to take a horizontal synchronization). This horizontal synchronization sensor is used to correct the recording position at regular intervals.

However, the precondition for precise alignment of the recording position of the scanning optical system is that an edge line direction of a light receiving surface of the horizontal synchronization sensor is substantially perpendicular to a main scanning direction in which light fluxes are scanned. If this precondition is not satisfied, it is difficult to properly correct deviation of the light fluxes in the main scanning direction, which occurs on an imaging plane.

To overcome such a problem, JP-A-2002-341272 discloses a technique for preventing deviation of a recording position of a multi-beam laser. In the technique disclosed in JP-A-2002-341272, an integrated unit including BD slits and BD sensors (BD detecting unit) is arranged around an optical axis of a scanning lens in a rotationally adjustable manner.

The following techniques have been known as techniques related to the technique for preventing deviation of the recording position of the multi-beam laser.

According to a technique disclosed in JP-A-2006-215483, by moving position in an optical axial direction of reference light flux detecting means (synchronization detecting sensors), which is arranged at an optical scanning start side and an optical scanning end side, toward a predetermined direction, it is possible to reduce positional deviation in a main scanning direction between two laser beams (deviation between the optical scanning start side and the optical scanning end side), which occurs when a light flux incident on an optical deflector (or a scanning optical system) is a "convergent light flux", thereby preventing image quality from being deteriorated.

According to a technique disclosed in JP-A-2002-107645, delay time from detection of a synchronization detecting signal to write initiation may be adjusted either in an electrical manner or in a mechanical manner such as adjusting an angle of a mirror to direct a light flux to a light receiving means.

According to a technique disclosed in JP-A-2000-255096, by adjusting an attachment position of a BD unit in advance such that scan light for obtaining a reference signal of image write is incident on the center of an effective detection portion of a BD unit, it is possible to improve compatibility of a scanner unit.

According to a technique disclosed in JP-A-2002-341271, a BD sensor and a BD slit plate for passing a laser beam to the BD sensor are accommodated in an optical box, and a BD slit provided in the BD slit plate is formed with a slit shape inclined at a predetermined angle θ (0°<θ<90°) with respect to a scan direction of a scan lens, thereby achieving simplification of BD recording timing adjustment.

According to a technique disclosed in JP-A-2002-357778, an optical beam scanning apparatus in which an optical box attached with a light source part, a deflector, an optical part, a horizontal synchronization detecting means and a reflecting member is attached to an optical bench by means of a plurality of couplers has a support member provided in a shakable manner with respect to the optical box for supporting and fixing the reflecting member on the optical box by adjusting its position relative to the optical box.

According to a technique disclosed in JP-A-2004-333556, for a small-sized scanning optical apparatus to direct a light flux to a BD sensor via a BD lens without passing through a scan lens, recording adjustment of scan lines may be made by moving the BD lens in a main scanning direction.

However, in the technique disclosed in JP-A-2002-341272, since there exists no reference required for rotational adjustment of the horizontal synchronization sensor, there is a need to make the rotational adjustment while seeing deviation of beam spots of light fluxes being actually scanned. However, since a group of beam spots has no vertical reference to emission points, there is a problem of difficulty in producing verticality of the horizontal synchronization sensor on the basis of a group of actual beam spots. In addition, there is a problem of difficulty in determining positions of the horizontal synchronization sensor and the slits.

SUMMARY OF THE INVENTION

In light of the above circumstances, an object of the present invention is to provide an optical beam scanning apparatus which is capable of properly adjusting deviation of a recording position while making precise rotational adjustment of a horizontal synchronization sensor, and an image forming apparatus equipped with the optical beam scanning apparatus.

To achieve the above object, according to an aspect of the invention, there is provided an optical beam scanning beam apparatus including: a body housing; a light source configured to emit one or plural light fluxes; a pre-deflection optical system configured to give a predetermined characteristic to the light flux emitted from the light source; an optical beam deflecting device configured to deflect the light flux, which is given with the predetermined characteristic by the pre-deflection optical system, to an scanned object by means of reflection in a main scanning direction; a sensor configured to detect a portion of the light flux deflected by the optical beam deflecting device; a holder base fixed to the body housing by screws; a rotating holder attached to the holder base and provided with a shaft; a sensor substrate fixed to the rotating holder by screws, the sensor being fixed to the sensor substrate; a rotation adjusting mechanism configured to rotationally adjust the rotating holder around the shaft with respect to the holder base; and a fixing mechanism configured to fix the rotating holder to the holder base.

According to another aspect of the invention, there is provided an image forming apparatus having an optical beam scanning apparatus including: a body housing; a light source configured to emit one or plural light fluxes; a pre-deflection optical system configured to give a predetermined characteristic to the light flux emitted from the light source; an optical beam deflecting device configured to deflect the light flux, which is given with the predetermined characteristic by the pre-deflection optical system, to an scanned object by means of reflection in a main scanning direction; a sensor configured to detect a portion of the light flux deflected by the optical beam deflecting device; a holder base fixed to the body housing by screws; a rotating holder attached to the holder base and provided with a shaft; a sensor substrate fixed to the rotating holder by screws, the sensor being fixed to the sensor substrate; a rotation adjusting mechanism configured to rotationally adjust the rotating holder around the shaft with respect to the holder base; and a fixing mechanism configured to fix the rotating holder to the holder base.

DETAILED DESCRIPTION OF EMBODIMENTS

Hereinafter, embodiments of the present invention will be described with reference to the accompanying drawings.

Figure 1:
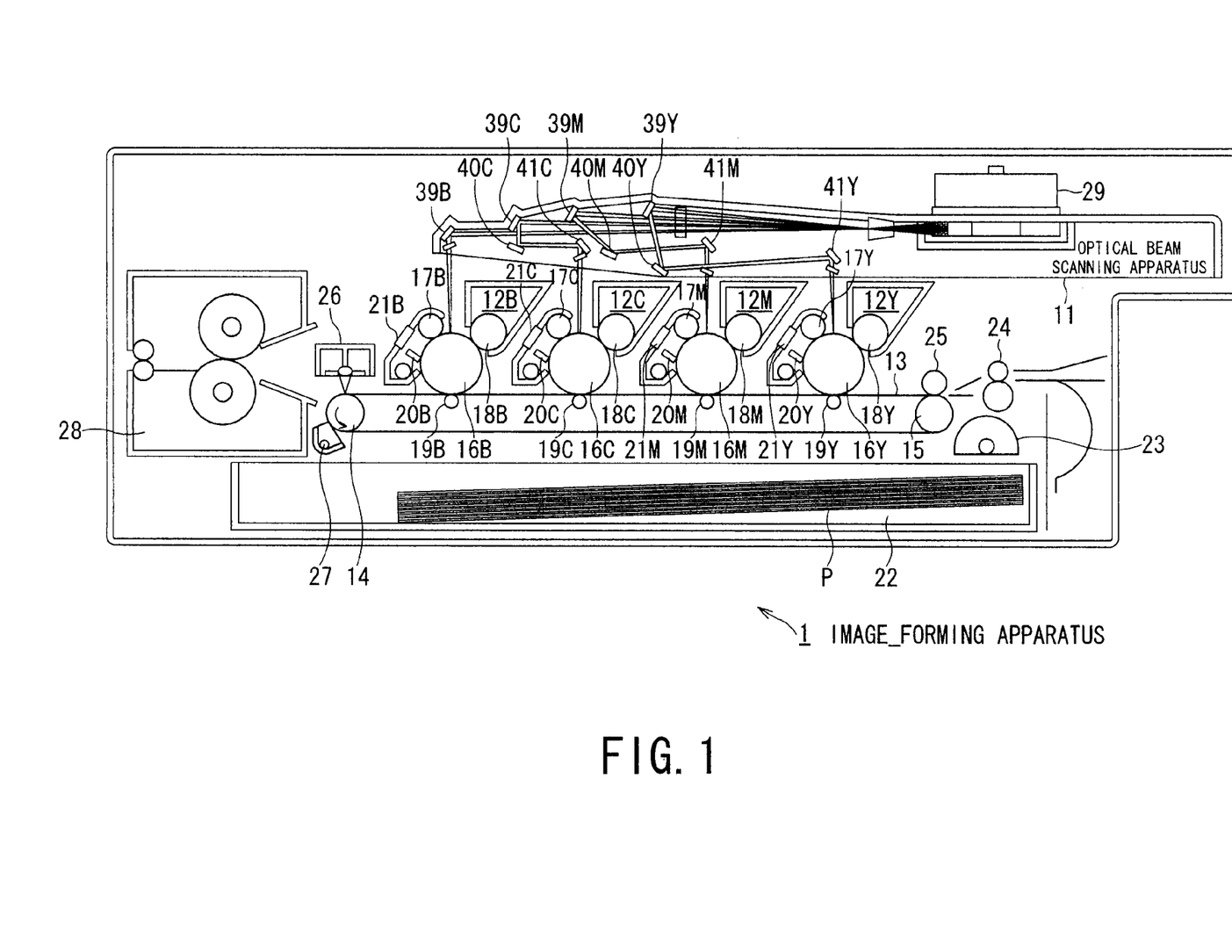
FIG. 1 is a side view showing a configuration of an image forming apparatus equipped with an optical beam scanning apparatus to which the present invention is applied.

FIG. 1 shows a configuration of an image forming apparatus 1 equipped with an optical beam scanning apparatus 11 to which the present invention is applied.

Since the image forming apparatus 1 typically uses four kinds of image data separated for respective color component of Y (yellow), M (magenta), C (cyan) and B (black), and four sets of devices for forming an image for color component corresponding to each of Y, M, C and B, it identifies the image data for respective color components and the devices corresponding to respective color components by adding Y, M, C and B.

As shown in FIG. 1, the image forming apparatus 1 has first to fourth image forming parts 12Y, 12M, 12C and 12B for forming an image for each separated color component.

The image forming parts 12 (12Y, 12M, 12C and 12B) are arranged in the order below the optical beam scanning apparatus 11 corresponding to each of positions at which laser beams L (LY, LM, LC and LB) for respective color components are emitted by a first post-deflection reflecting mirror 39B and third post-deflection reflecting mirrors 41Y, 41M and 41C of the optical beam scanning apparatus 11.

A carrying belt 13 for carrying a recording sheet P on which images formed through the respective image forming parts 12 (12Y, 12M, 12C and 12B) are transferred is arranged below the image forming parts 12 (12Y, 12M, 12C and 12B).

The carrying belt 13 is laid across a belt driving roller 14, which is rotated in a direction indicated by an arrow by a motor (not shown), and a tension roller 15, and is rotated at a predetermined speed in the rotation direction of the belt driving roller 14.

The image forming parts 12 (12Y, 12M, 12C and 12B) have respective photoconductive drums 16Y, 16M, 16C and 16B which have a cylindrical shape rotatable in a direction indicated by an arrow and on which electrostatic latent images corresponding to images exposed to light by the optical beam scanning apparatus 11 are formed. These photoconductive drums 16 are defined as "scanned object".

Around the photoconductive drums 16 (16Y, 16M, 16C and 16B), electrifying devices 17 (17Y, 17M, 17C and 17B) for providing a predetermined potential to surfaces of the photoconductive drums 16 (16Y, 16M, 16C and 16B), developing devices 18 (18Y, 18M, 18C and 18B) for developing the electrostatic latent images formed on the surfaces of the photoconductive drums 16 (16Y, 16M, 16C and 16B) by supplying toner given with colors corresponding to the electrostatic latent images, transferring devices 19 (19Y, 19M, 19C and 19B) for transferring toner images of the photoconductive drums 16 (16Y, 16M, 16C and 16B) onto a recording medium, that is, the recording sheet P, carried by the carrying belt 13, cleaners 20 (20Y, 20M, 20C and 20B) for removing toner remaining on the photoconductive drums 16 (16Y, 16M, 16C and 16B), and neutralizing devices 21 (21Y, 21M, 21C and 21B) for eliminating a potential remaining on the photoconductive drums 16 (16Y, 16M, 16C and 16B) after transfer of the toner images are arranged in the order along a rotation direction of the photoconductive drums 16 (16Y, 16M, 16C and 16B).

The transferring devices 19 (19Y, 19M, 19C and 19B) face the photoconductive drums 16 (16Y, 16M, 16C and 16B) from the rear side of the carrying belt 13 with the carrying belt 13 interposed between the transferring devices 19 (19Y, 19M, 19C and 19B) and the photoconductive drums 16 (16Y, 16M, 16C and 16B).

A sheet cassette 22 for accommodating recording sheets P to be transferred with images formed by the image forming parts 12 (12Y, 12M, 12C and 12B) is arranged below the carrying belt 13. In addition, the cleaners 20 (20Y, 20M, 20C and 20B) remove the toner remaining on the photoconductive drums 16 (16Y, 16M, 16C and 16B), which was not transferred in the transfer of the toner images onto the recording sheet P by the transferring devices 19 (19Y, 19M, 19C and 19B)

A crescent-shaped feeding roller 23 for drawing out the recording sheets P accommodated in the sheet cassette 22, one by one, from the top of the sheet cassette 22 is arranged at one end of the sheet cassette 22 and near the tension roller 15.

A registration roller 24 for registering a leading end of one recording sheet P drawn out of the cassette 22 with a leading end of a toner image formed on the photoconductive drum 16B of the image forming part 12B (black) is disposed between the feeding roller 23 and the tension roller 15.

An absorption roller 25 for providing a predetermined electrostatic absorbing force to one recording sheet P carried by the registration roller 24 at a predetermined timing is disposed near the tension roller 15 between the registration roller 24 an the first image forming part 12Y and at a position which is substantially opposite to an outer side of the carrying belt 13 and corresponds to a position at which the tension roller 15 contacts the carrying belt 13.

A first registration sensor 26a and a second registration sensor 26b for detecting positions of images formed on the carrying belt 13 or images transferred onto the recording sheets P are disposed at one end of the carrying belt 13, near the belt driving roller 14 and on the outer side of the carrying belt 13 substantially contacting the belt driving roller 14, with a predetermined distance between both sensors in an axial direction of the belt driving roller 14 (since FIG. 1 is a front sectional view, the first registration sensor 26a located in front of a face of paper is not seen).

A carrying belt cleaner 27 for removing toner attached to the carrying belt 13 or small fragments of the recording sheets P is disposed on the outer side of the carrying belt 13 contacting the belt driving roller 14 and at a position at which the carrying belt cleaner 27 does not contact the recording sheet P carried by the carrying belt 13.

A fixation device 28 for fixing the toner images, which were transferred onto the recording sheets P, on the recording sheets P is disposed in a direction in which the recording sheets P carried through the carrying belt 13 are cast off from the belt driving roller 14 and are further carried to.

Figure 2:
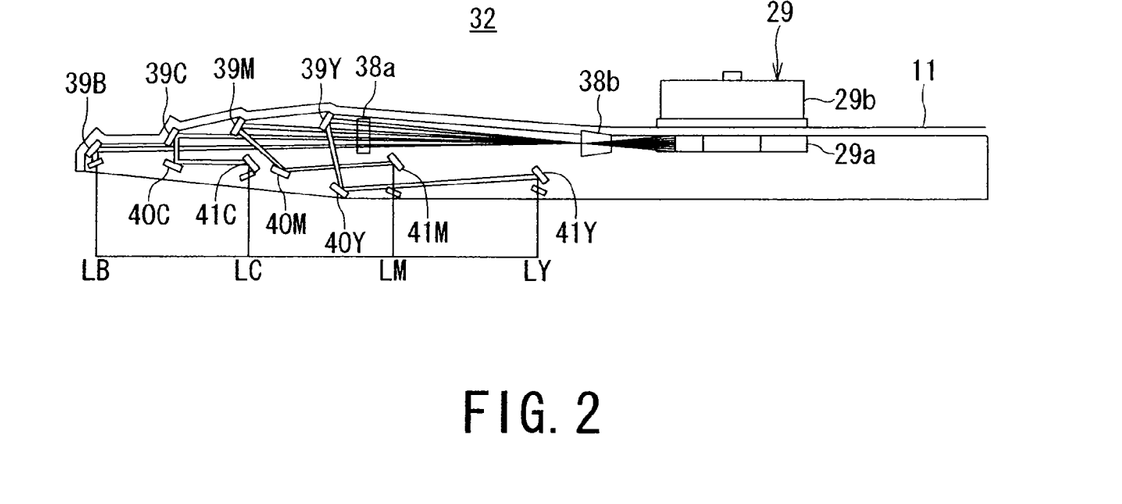
FIG. 2 is a view showing a detailed configuration of the optical beam scanning apparatus shown in FIG. 1.
Figure 3:
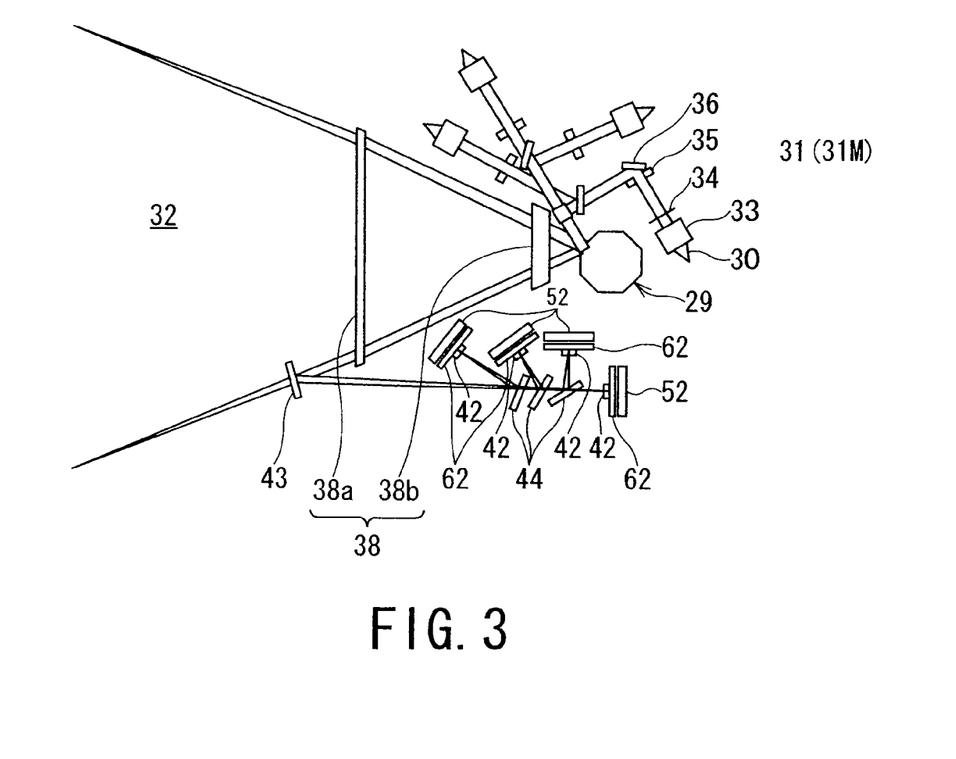
FIG. 3 is a view showing a detailed configuration of the optical beam scanning apparatus shown in FIG. 1.

FIGS. 2 and 3 show a detailed configuration of the optical beam scanning apparatus 11 shown in FIG. 1.

The optical beam scanning apparatus 11 has an optical beam deflecting device 29 including a polygonal mirror body (so-called polygon mirror) 29a having, for example, 8-plane reflecting surfaces (plane reflecting mirrors) arranged in a regular polygonal shape and a motor 29b for rotating the polygonal mirror body 29a at a predetermined speed in a main scanning direction, and light sources (LD array) 30 (30Y, 30M, 30C and 30B) for emitting light beams to the first to fourth image forming parts 12 (12Y, 12M, 12C and 12B) shown in FIG. 1, respectively.

The optical beam deflecting device 29 is a deflecting means for deflecting (scanning) light beams (laser beams), which are emitted from the light sources 30 (30Y, 30M, 30C and 30B), to image planes disposed at predetermined positions (that is, outer sides of the photoconductive drums 16Y, 16M, 16C and 16B of the first to fourth image forming parts 12Y, 12M, 12C and 12B) at a predetermined linear speed. In addition, pre-deflection optical systems 31 (31Y, 31M, 31C and 31B) are disposed between the optical beam deflecting device 29 and the light sources 30 (30Y, 30M, 30C and 30B) and a post-deflection optical system 32 is disposed between the optical beam deflecting device 29 and the image planes.

A direction in which the laser beams are deflected (scanned) by the polygon mirror (the polygonal mirror body 29a shown in FIG. 3) (a rotational axial direction of the photoconductive drums 16) is defined as "main scanning direction" and a direction which is perpendicular to the optical axial direction of the optical system and the main scanning direction is defined as "sub-scanning direction". Accordingly, the sub-scanning direction is the rotational direction of the photoconductive drums 16. In addition, "image plane" indicates the outer side of the photoconductive drums 16 and "imaging plane" indicates a plane on which a light flux (laser beam) is actually imaged.

As shown in FIG. 3, the pre-deflection optical systems 31 include the light sources 30 (30Y, 30M, 30C and 30B) for respective color components, such as laser diodes, finite focusing lenses 33 (33Y, 33M, 33C and 33B) for condensing the laser beams emitted from the light sources 30 (30Y, 30M, 30C and 30B), diaphragm 34 (34Y, 34M, 34C and 34B) for giving any section beam shape to the laser beams L that passed the finite focusing lenses 33 (33Y, 33M, 33C and 33B), and cylindrical lenses 35 (35Y, 35M, 35C and 35B) for again condensing the laser beams passed the diaphragm 34 (34Y, 34M, 34C and 34B) in the sub-scanning direction, and directs the laser beams emitted from the light sources 30 (30Y, 30M, 30C and 30B) and having a predetermined section beam shape to a reflecting surface of the optical beam deflecting device 29.

A cyan laser beam LC emitted from the cylindrical lens 35C is bent in its optical path by a reflecting mirror 36C, passes through an optical path combining optical part 37, and then is guided to the reflecting surface of the optical beam deflecting device 29. A black laser beam LB emitted from the cylindrical lens 35B is bent in its optical path by a reflecting mirror 36B, reflected by the optical path combining optical part 37, and then is guided to the reflecting surface of the optical beam deflecting device 29. A yellow laser beam LY emitted from the cylindrical lens 35Y passes over the reflecting mirror 36C, passes through the optical path combining optical part 37, and then is guided to the reflecting surface of the optical beam deflecting device 29. A magenta laser beam LM emitted from the cylindrical lens 35M is bent in its optical path by a reflecting mirror 36M, passes over the reflecting mirror 36B, reflected by the optical path combining optical part 37, and then is guided to the reflecting surface of the optical beam deflecting device 29.

The post-deflection optical system 32 includes two fθ lenses 38 (38a and 38b) as imaging lenses for optimizing shape and position of the laser beams L (Y, M, C and B), which are deflected (scanned) by the polygonal mirror body 29a, on the image planes, a horizontal synchronization sensor 42 for detecting the laser beams L in the order to align horizontal synchronization of the laser beams L (LY, LM, LC and LB) passed the fθ lenses 38 (38a and 38b), a horizontal synchronization reflecting mirror 43 for reflecting the laser beams L toward the horizontal synchronization sensor 42, a separation mirror 44 disposed between the horizontal synchronization reflecting mirror 43 and the horizontal synchronization sensor 42 for approximately matching the laser beams L (LY, LM, LC and LB) for respective color components, which were reflected toward the horizontal synchronization sensor 42 by the horizontal synchronization reflecting mirror 43, to an incident position on a detection surface of the horizontal synchronization sensor 42, a sensor substrate 62 to which the horizontal synchronization sensor 42 is fixed, and a plurality of post-deflection reflecting mirrors 39Y, 40Y and 41Y (yellow); 39M, 40M and 41M (magenta); 39C, 40C and 41C (cyan); and 39B (black) for directing the laser beams L (LY, LM, LC and LB) for respective color components, which were emitted from the fθ lenses 38 (38a and 38b), to corresponding photoconductive drums 16 (16Y, 16M, 16C and 16B).

Figure 4:
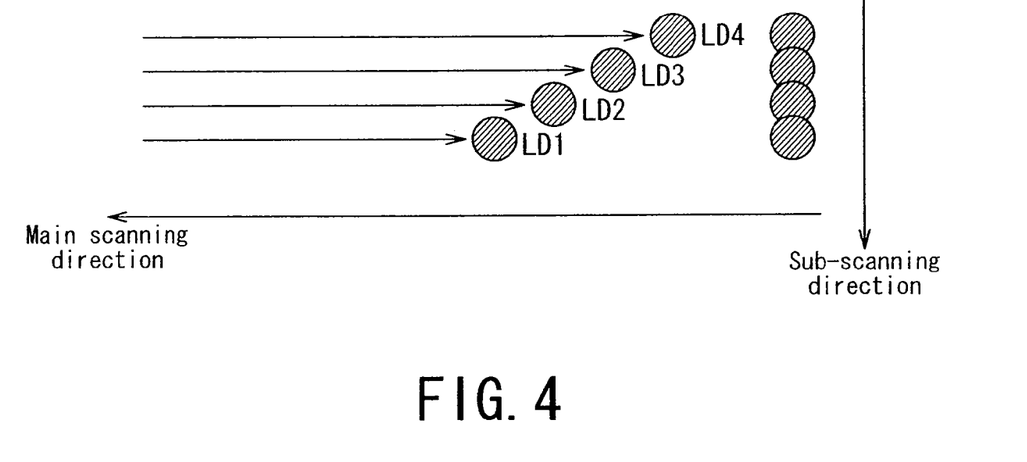
FIG. 4 is an explanatory view for explaining arrangement of beams on an imaging plane in an optical system using a light source having a plurality of emission points.

However, for an optical system using the light source (LD array) 30 having a plurality of emission points (optical system using a multi-beam method), if a beam-to-beam pitch in a sub-scanning direction on an imaging plane (plane in which a laser beam (light flux) is actually imaged) is set to be a desired value (for example, about 42 μm for 600 dpi and about 21 μm for 1200 dpi), since the emission points have a required distance (deviation) therebetween in a main scanning direction without being arranged in a row in the sub-scanning direction in view of magnification of the optical system, for example, as shown in FIG. 4, there is a need to adjust a recording position. In the multi-beam method using the light source 30 having the plurality of emission points, as recording timings on image planes of photoconductive drums 16 are deviated from each other, positional deviation of the laser beams scanned on the photoconductive drums 16 occurs in the main scanning direction, which may result in deterioration of image quality due to the positional deviation of the laser beams.

Figure 5:
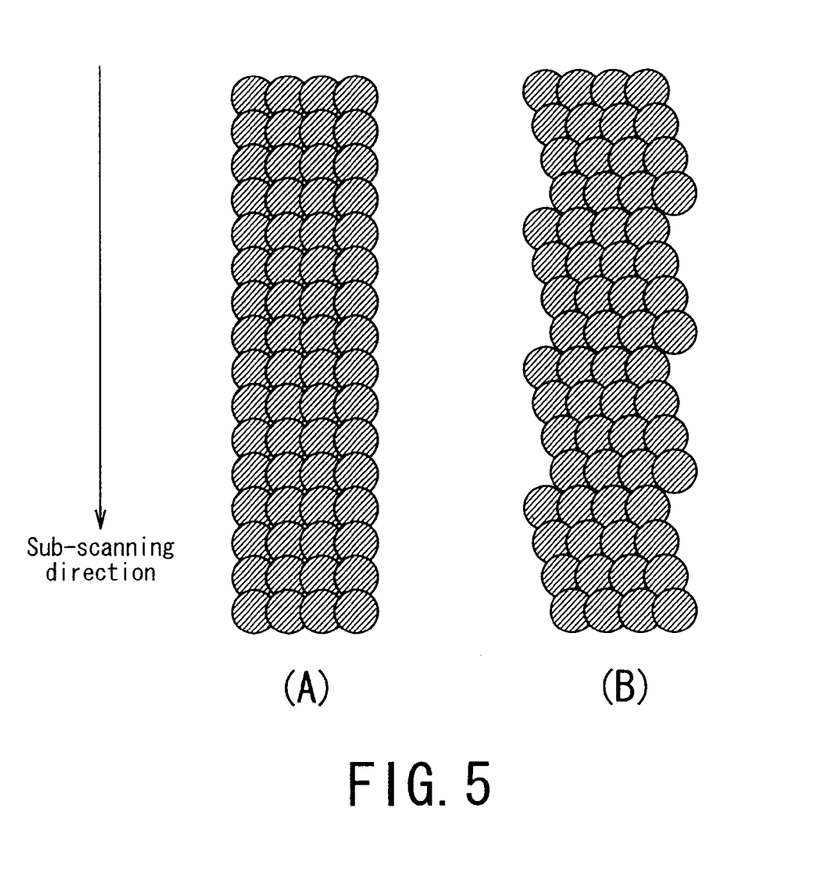
FIGS. 5A and 5B are views showing an example of vertical lines drawn in a sub-scanning direction using four laser beams.

FIGS. 5A and 5B are views showing an example of vertical lines drawn in a sub-scanning direction using four laser beams. FIG. 5A shows an example of vertical lines drawn in the sub-scanning direction using four laser beams with recording positions of the four laser beams aligned, without being deviated, in the main scanning direction. On the other hand, FIG. 5B shows an example of vertical lines drawn in the sub-scanning direction using four laser beams with recording positions of the four laser beams deviated from each other in the main scanning direction. As can be seen from the comparison between FIGS. 5A and 5B, when the recording positions of the four laser beams are deviated from each other in the main scanning direction, the vertical lines drawn in the sub-scanning direction may be shaken.

In the prior art, for example, in an optical beam scanning apparatus using a multi-beam method, a portion of light flux reflected on a deflection surface of the polygonal mirror body (polygon mirror) 29a is detected by the horizontal synchronization sensor 42 and is used as a horizontal synchronization adjusting signal in order to align a recording position of lead-off laser beam and respective recording positions corresponding to respective laser beams located with required distance in the main scanning direction from thus recording position (that is, in order to take a horizontal synchronization). Then, this horizontal synchronization sensor 42 is used to correct the recording position at regular intervals.

However, the precondition for precise alignment of the recording position of the scanning optical system is that an edge line direction of a sensor face R (a light receiving surface) of the horizontal synchronization sensor 42 is substantially perpendicular to a main scanning direction in which light fluxes are scanned. If this precondition is not satisfied, it is difficult to properly correct deviation of the light fluxes in the main scanning direction, which occurs on an imaging plane. To overcome such a problem, JP-A-2002-341272 discloses a technique for preventing deviation of a recording position of a multi-beam laser.

However, in the technique disclosed in JP-A-2002-341272, since there exists no reference required for rotational adjustment of the horizontal synchronization sensor 42, there is a need to make the rotational adjustment while seeing deviation of beam spots of light fluxes being actually scanned. However, since a group of beam spots has no vertical reference to emission points, there is a problem of difficulty in producing verticality of the edge line of the sensor face R of the horizontal synchronization sensor 42 on the basis of a group of actual beam spots.

Figure 6:
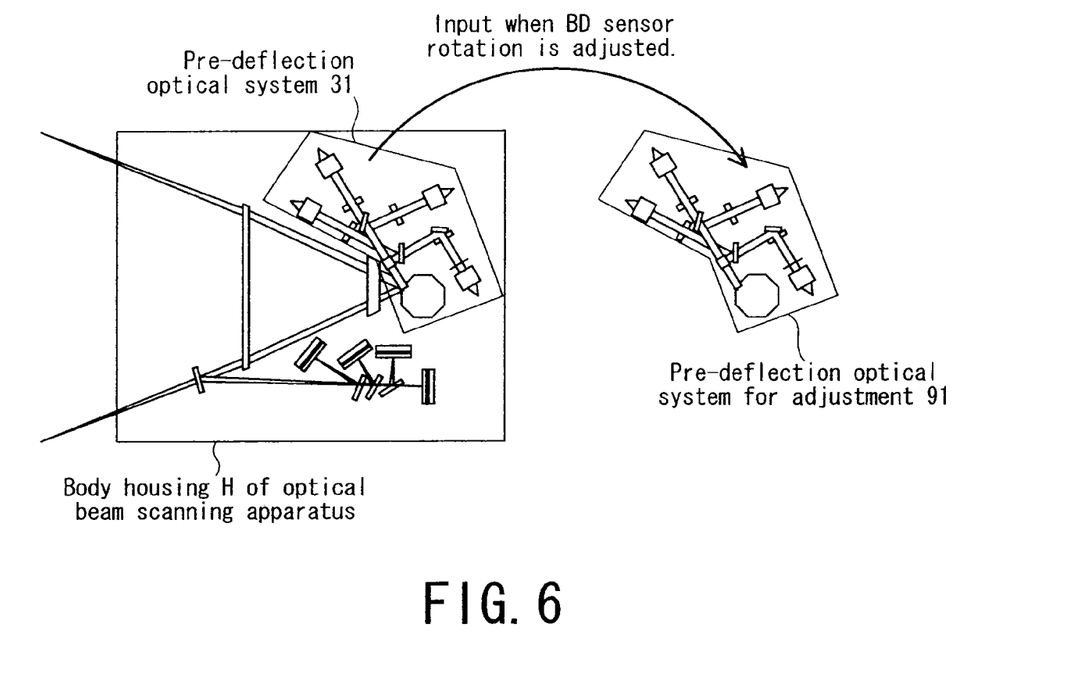
FIG. 6 is an explanatory view for explaining the concept of a rotational adjustment method of a horizontal synchronization sensor.
Figure 7:
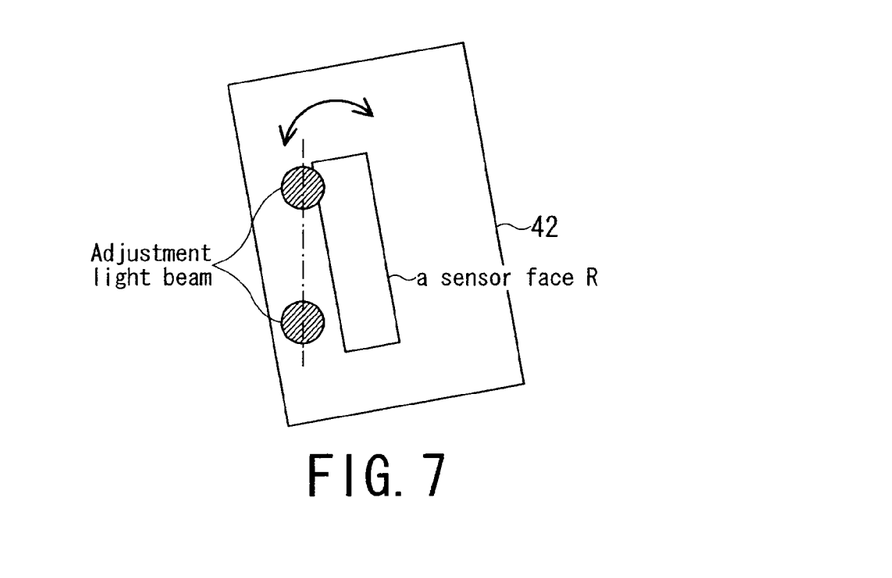
FIG. 7 is an explanatory view for explaining a rotational adjustment method of a horizontal synchronization sensor using a horizontal synchronization sensor holder.

In the present invention, the pre-deflection optical system 31 is mounted on the same plate in a detachable manner and can be exchanged with a pre-deflection optical system 91 for adjustment, which is separately prepared. In the pre-deflection optical system 31 for adjustment, beam spots on the image plane on the photoconductive drum 16 are purposely set such that they are arranged in a row in the sub-scanning direction. For example, as shown in FIG. 6, when the horizontal synchronization sensor 42 is rotationally adjusted such that the plane direction of the sensor face R (the light receiving surface) of the horizontal synchronization sensor 42 is substantially perpendicular to the main scanning direction in which light fluxes are scanned, first, the pre-deflection optical system 31 mounted on a body housing H of the optical beam scanning apparatus 11 is exchanged with the pre-deflection optical system 91 for adjustment. Next, as shown in FIG. 7, using a horizontal synchronization sensor holder (horizontal synchronization sensor holder 51 shown in FIGS. 8 to 10) for holding the horizontal synchronization sensor 42, the horizontal synchronization sensor 42 is rotationally adjusted such that the adjustment beam spots are simultaneously incident on the sensor face R (the light receiving surface) of the horizontal synchronization sensor 42. Accordingly, since deviation of the recording positions can be properly adjusted while making the precise rotational adjustment of the horizontal synchronization sensor 42, it is possible to form a stable image. Hereinafter, a rotational adjustment method of the horizontal synchronization sensor 42 using the horizontal synchronization sensor holder will be described in detail.

Figure 8A:
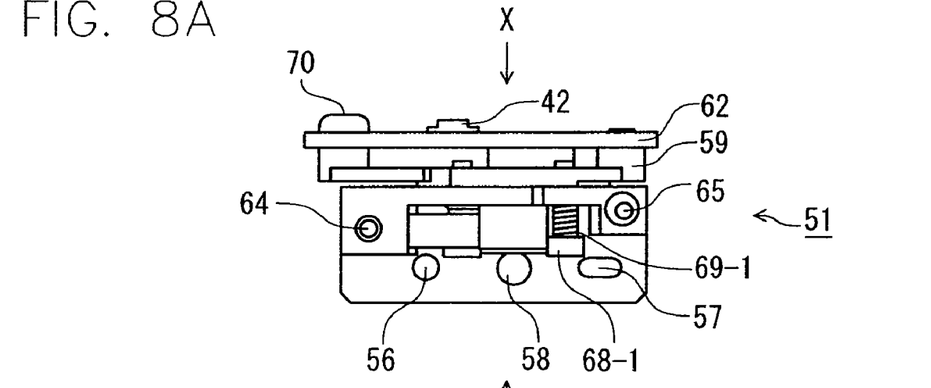
FIGS. 8A to 8C are views showing a detailed configuration of a horizontal synchronization sensor holder for holding a horizontal synchronization sensor.
Figure 8B:
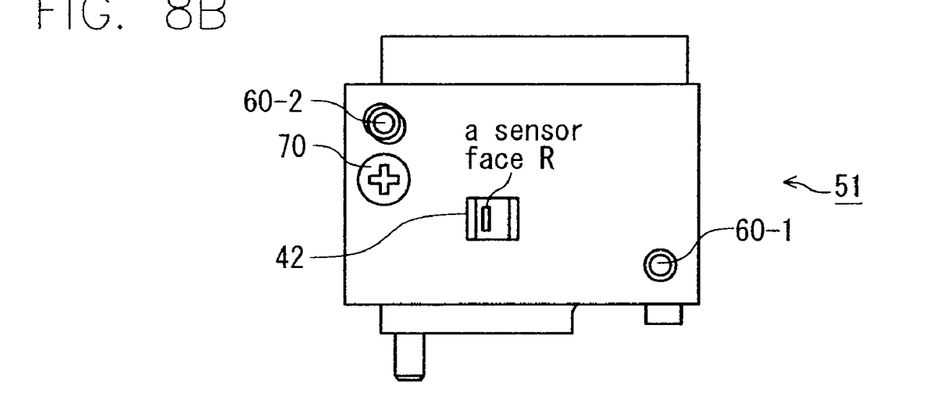
Figure 8C:
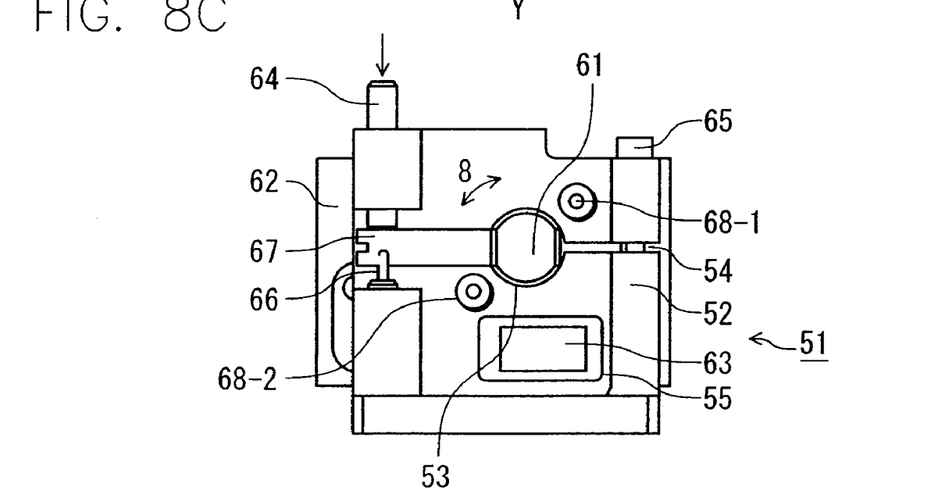

FIGS. 8A to 8C are views showing a detailed configuration of the horizontal synchronization sensor holder 51 for holding the horizontal synchronization sensor 42. FIG. 8A is a plan view of the horizontal synchronization sensor holder 51, FIG. 8B is a front view of the horizontal synchronization sensor holder 51 of FIG. 8A when viewed from an X direction, and FIG. 8C is a front view of the horizontal synchronization sensor holder 51 of FIG. 8A when viewed from a Y direction.

As shown in FIGS. 8A to 8C, the horizontal synchronization sensor holder 51 includes a holder base 52 fixed to the body housing H of the optical beam scanning apparatus 11 by screws, a rotating holder 59 attached to the holder base 52, and a sensor substrate 62 fixed to the rotating holder 59 by screws and to which the horizontal synchronization sensor 42 is fixed.

Figure 9:
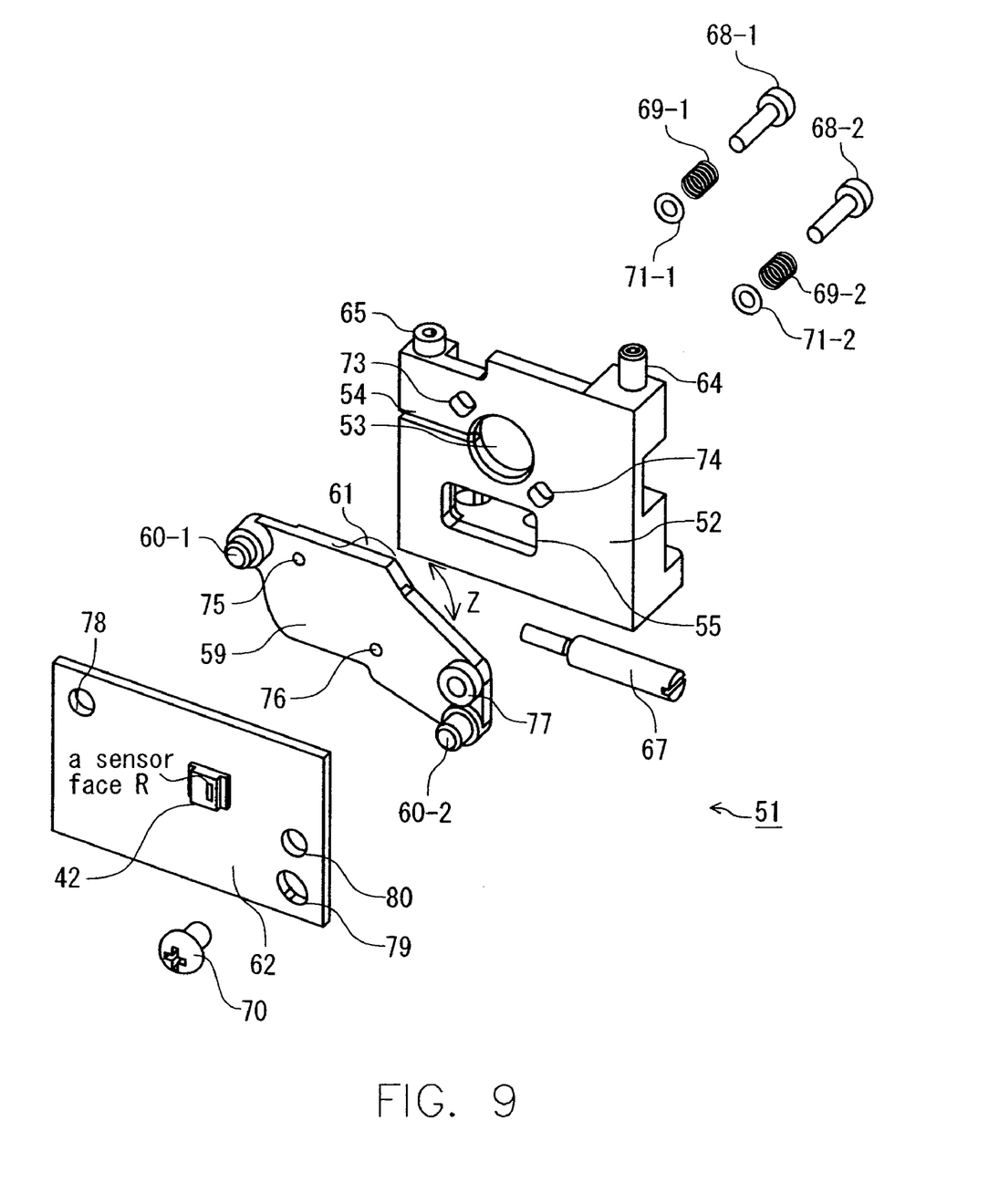
FIG. 9 is an exploded view of the horizontal synchronization sensor holder shown in FIG. 8A when viewed in an X direction.
Figure 10:
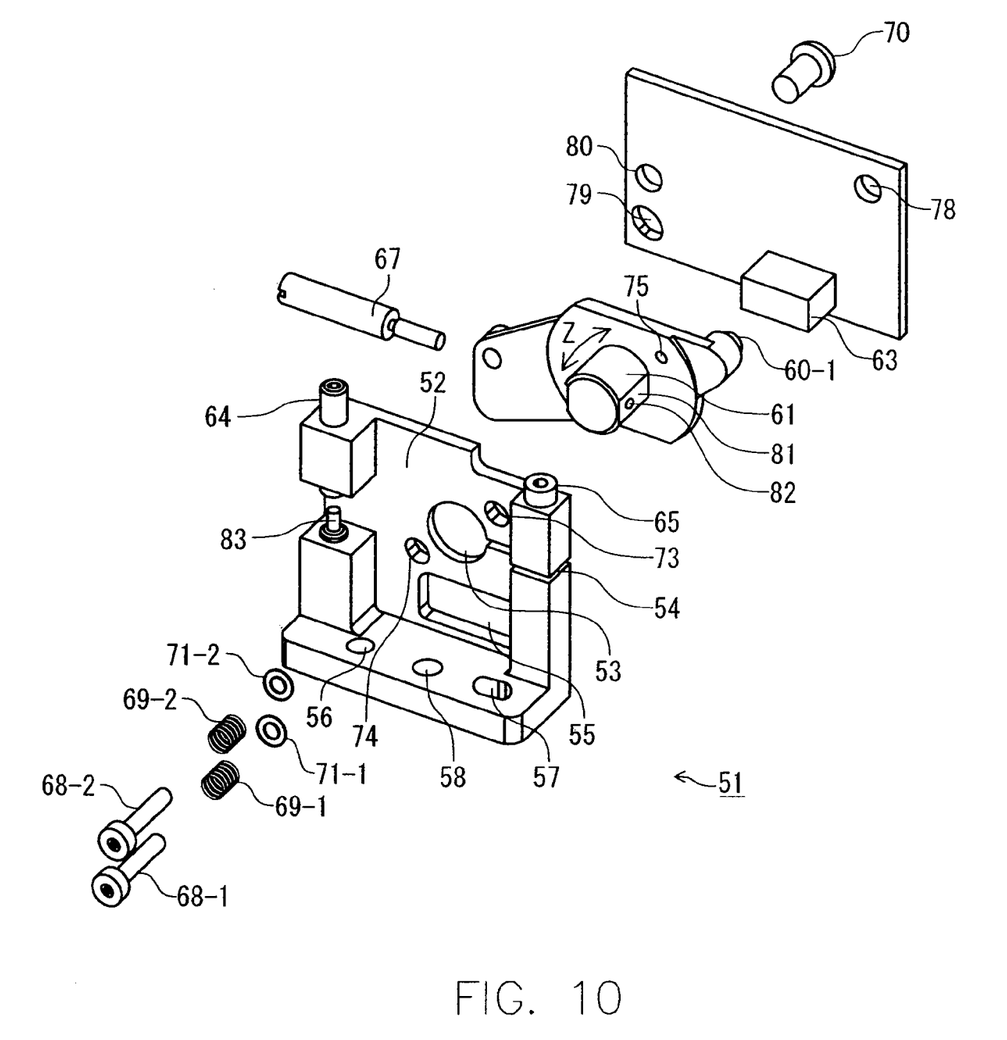
FIG. 10 is an exploded view of the horizontal synchronization sensor holder shown in FIG. 8A when viewed in a Y direction.

FIG. 9 is an exploded view of the horizontal synchronization sensor holder 51 shown in FIG. 8A when viewed in the X direction, and FIG. 10 is an exploded view of the horizontal synchronization sensor holder 51 shown in FIG. 8A when viewed in the Y direction.

The holder base 52 is provided with a pinhole 56 and a positioning oval hole 57. The holder base 52 is positioned with respect to the body housing H as two positioning pins (not shown) provided in the body housing H of the optical beam scanning apparatus 11 are inserted in the pinhole 56 and the positioning oval hole 57. The holder base 52 is further provided with a screw passing hole 58, and a screw (not shown) inserted through the screw passing hole 58 is screwed into a screw hole (not shown) provided in the body housing H. Thus, the holder base 52 is fixed to the body housing H.

As shown in FIGS. 9 and 10, the sensor substrate 62 is provided with a pinhole 78 and a positioning oval hole 79 for positioning and a screw passing hole 80 for fixation. The rotating holder 59 is provided with positioning pins 60-1 and 60-2 and a screw hole 77. A screw 70 inserted through the screw passing hole 80 is screwed into the screw hole 77 of the rotating holder 59. Thus, the sensor substrate 62 is fixed to the rotating holder 59.

The rotating holder 59 is provided with a cylindrical shaft 61. The holder base 52 has a shaft hole 53 into which the shaft 61 of the rotating holder 59 is fitted. The rotating holder 59 is fitted in the holder base 52 with a gap by fitting of the shaft 61 into the shaft hole 53 of the holder base 52. In other words, fitting of the shaft 61 of the rotating holder 59 into the shaft hole 53 of the holder base 52 is preset with a gap therebetween such that the rotating holder 59 can rotate around the shaft 61 in a Z direction.

The rotating holder 59 is attached to the holder base 52 by means of rotating holder fixing screws 68-1 and 68-2, and compressing springs 69-1 and 69-2 and washers 71-1 and 71-2 are interposed between the holder fixing screws 68-1 and 68-2 and the rotating holder 59 in order to suppress the rotating holder 59 from floating in a shaft direction without suppressing the rotating holder 59 from being rotated around the shaft 61 in the Z direction. The rotating holder fixing screws 68-1 and 68-2 are screwed into screw holes 75 and 76 of the rotating holder 59 after passing through the compressing springs 69-1 and 69-2, the washers 71-1 and 71-2 and oval holes 73 and 74 of the holder base 52. Thus, a spring load is set by the compressing springs 68-1 and 68-2 to allow the rotating holder 59 to be rotated while holding the rotating holder 59 in the shaft direction. It should be noted that the oval holes 73 and 74 are set so that the holder 59 can rotate by required degrees.

A leaf spring may be used instead of the compressing springs 69-1 and 69-2. In addition, the holder base 52 is provided with a terminal window 55 into which a terminal 63 provided in the sensor substrate 62 is fitted.

As shown in FIGS. 8 to 10, the holder base 52 is provided with a slit 54 as a dividing groove from the shaft hole 53 toward a lateral side, and holder base elements 52a and 52b, which are separated by the slit 54, may come close to each other by tightening a tightening screw 65. This tightening allows variation of a width of the slit 54 and allows the shaft 61 of the rotating holder 59, which is fitted into the shaft hole 53 of the holder base 52, to be tightened by the tightening screw 65 such that the rotating holder 59 is fixed to be suppressed from being freely rotated in the Z direction.

In addition, as shown in FIGS. 8 to 10, flat portions 81 are provided in both sides of the shaft 61 of the rotating holder 59, and a screw hole 82 is provided in the flat portion 81. An adjustment arm 67 is fixed to the screw hole 82. As shown in FIG. 8, the adjustment arm 67 is fixed to the screw hole 82 of the shaft 61 after the shaft 61 of the rotating holder 59 is fitted into the shaft hole 53 of the holder base 52.

In addition, the holder base 52 is provided with a set screw 64 for pressing the adjustment arm 67 downward from the top of the adjustment arm 67 when the rotating holder 59 is fitted into the holder base 52, and a spring plunger 66 for pressing the adjustment arm 67 upward from the bottom of the adjustment arm 67.

As shown in FIG. 8C, when the horizontal synchronization sensor holder 51 is accessed from an upper direction and the set screw (adjustment screw) 64 is rotated by a predetermined amount to advance downward (or upward), the adjustment arm 67 is moved downward and thus the rotating holder 59 can be rotationally adjusted counterclockwise in the Z direction. On the other hand, when the set screw 64 is rotated by a predetermined amount to advance upward (or downward), the adjustment arm 67 is moved upward and thus the rotating holder 59 can be rotationally adjusted clockwise in the Z direction. Accordingly, the sensor substrate 62 fixed to the rotating holder 59 by screws is also rotated by a required angle and the horizontal synchronization sensor 42 provided in the sensor substrate 62 is also rotated. This allows proper adjustment of deviation of recording positions while making precise rotational adjustment of the horizontal synchronization sensor 42 when the horizontal synchronization sensor holder 51 is accessed from an upper direction, thereby providing a stable image. As a result, it is possible to avoid increase in the unit size of the optical beam scanning apparatus 11 or the image forming apparatus 1.

It is preferable that a leading end of the set screw 64 has a spherical shape in consideration of slidability on the adjustment arm 67 for highly precise rotational adjustment of the adjustment arm 67. In addition, for example, a coil spring, a leaf spring or the like may be used instead of the spring plunger 66.

Figure 11:
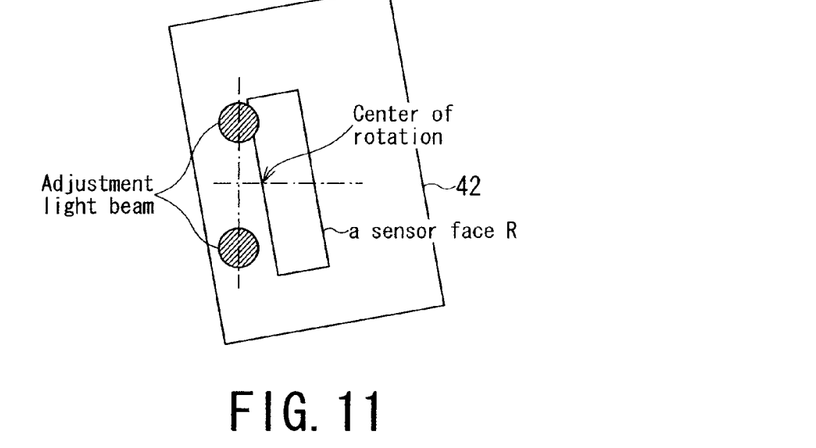
FIG. 11 is an explanatory view for explaining a rotational adjustment method of a horizontal synchronization sensor using a horizontal synchronization sensor holder.

In addition, since it is preferable that a sensor face R of the horizontal synchronization sensor 42 is not moved even when the horizontal synchronization sensor 42 is rotationally adjusted according to the above-described method, for example, as shown in FIG. 11, it is preferable that the center of the shaft 61 of the rotating holder 59 coincides with the center of the edge line of the sensor face R of the horizontal synchronization sensor 42.

Figure 12:
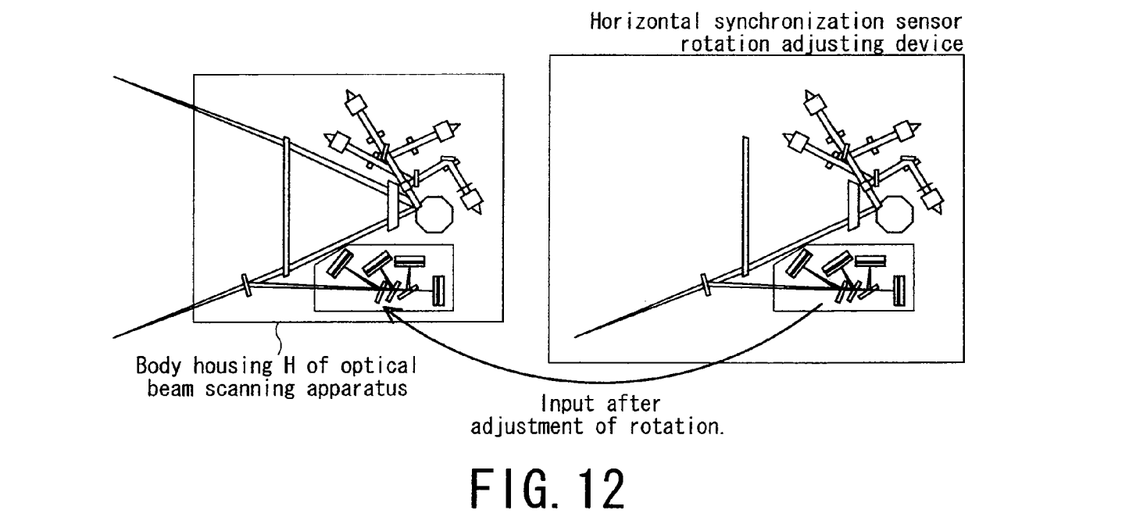
FIG. 12 is an explanatory view for explaining another concept of a rotational adjustment method of a horizontal synchronization sensor.

When the horizontal synchronization sensor 42 is rotationally adjusted such that the edge line direction of the sensor face R (the light receiving surface) of the horizontal synchronization sensor 42 is substantially perpendicular to the main scanning direction in which light fluxes are scanned, with the precondition that the pre-deflection optical system 31 is detachably mounted on the same plate and is exchangeable with the pre-deflection optical system 91 for adjustment which is separately prepared, the pre-deflection optical system 31 mounted on the body housing H of the optical beam scanning apparatus 11 is exchanged with the pre-deflection optical system 91 for adjustment and the horizontal synchronization sensor 42 is rotationally adjusted using the horizontal synchronization sensor holder 51 for holding the horizontal synchronization sensor 42 such that the adjustment beam spots are simultaneously incident on the sensor face R (the light receiving surface) of the horizontal synchronization sensor 42. However, without being limited thereto, for example, as shown in FIG. 12, in a state where the horizontal synchronization sensor 42 and horizontal synchronization sensor holder 51 are detachably mounted on the same plate, the horizontal synchronization sensor 42 may be rotationally adjusted using a separate horizontal synchronization sensor rotation adjusting device prepared in advance according to the rotational adjustment method described with reference to FIGS. 8 to 10. In addition, after the rotational adjustment of the horizontal synchronization sensor 42, the rotationally adjusted detachable horizontal synchronization sensor 42 and horizontal synchronization sensor holder 51 on the same plate may be returned to the body housing H. In the horizontal synchronization sensor rotation adjusting device, beam spots on the image plane on the photoconductive drums 16 are purposely set to be arranged in a row in the sub-scanning direction.

Figure 13:
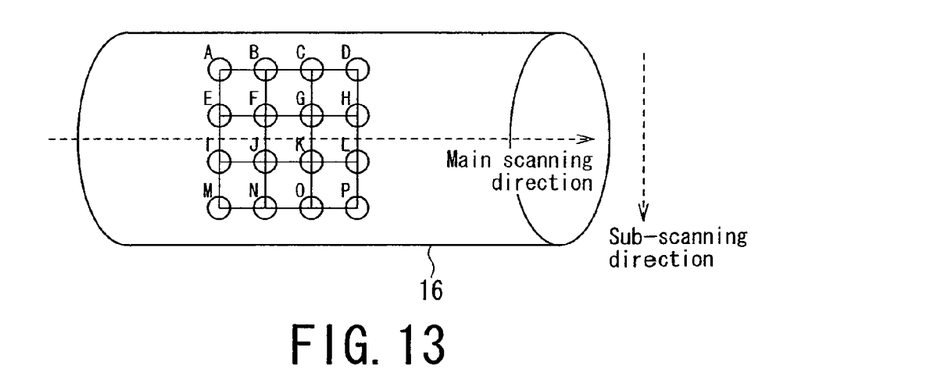
FIG. 13 is an explanatory view for explaining a configuration of a VCSEL (Vertical Cavity Surface Emitting Laser) applicable to the present invention.

For example, as shown in FIG. 13, the present invention may be applied to a case of using a plurality of light sources 30 (VCSEL (Vertical Cavity Surface Emitting Laser)) which are arranged in advance such that scan positions of laser beams are arranged in the form of a two-dimensional matrix (that is, the scan positions are arranged in time-series at predetermined intervals in the main and sub-scanning directions).

What is claimed is:

1. An optical beam scanning apparatus comprising:
   a body housing;
   a light source configured to emit one or plural light fluxes;
   a pre-deflection optical system configured to give a predetermined characteristic to the light flux emitted from the light source;
   an optical beam deflecting device configured to deflect the light flux, which is given with the predetermined characteristic by the pre-deflection optical system, to a scanned object by means of reflection in a main scanning direction;
   a sensor configured to detect a portion of the light flux deflected by the optical beam deflecting device;
   a holder base fixed to the body housing by a screw;
   a rotating holder attached to the holder base and provided with a shaft;
   a sensor substrate fixed to the rotating holder by a screw, the sensor being fixed to the sensor substrate;
   a rotation adjusting mechanism configured to rotationally adjust the rotating holder around the shaft with respect to the holder base; and
   a fixing mechanism configured to fix the rotating holder to the holder base.

2. The optical beam scanning apparatus according to claim 1,
   wherein the holder base is provided with a screw for pressing an adjustment arm provided in the rotating holder from the top of the adjustment arm and a pressing member for pressing the adjustment arm from the bottom of the adjustment arm, and
   wherein the rotation adjusting mechanism is configured to adjust rotation of the rotating holder by turning the screw in a predetermined direction to press the adjustment arm.

3. The optical beam scanning apparatus according to claim 2,
   wherein the rotation adjusting mechanism is configured to adjust rotation of the rotating holder counterclockwise by turning the screw to advance downward or upward.

4. The optical beam scanning apparatus according to claim 2,
   wherein the rotation adjusting mechanism is configured to adjusts rotation of the rotating holder clockwise by turning the screw to advance upward or downward.

5. The optical beam scanning apparatus according to claim 2,
   wherein the pressing member is configured to be a leaf spring, a coil spring or a spring plunger.

6. The optical beam scanning apparatus according to claim 2,
   wherein the screw is provided in an upper portion of the holder base.

7. The optical beam scanning apparatus according to claim 2,
   wherein the shaft provided at a predetermined position of the rotating holder is provided with at least one flat portion, and the adjustment arm is fixed to the flat portion by a screw.

8. The optical beam scanning apparatus according to claim 1,
   wherein the holder base is provided with a shaft hole into which the shaft provided at a predetermined position of the rotating holder is fitted with a gap therebetween, and a slit directing from the shaft hole toward a lateral side, and
   wherein the fixing mechanism is configured to fix the rotating holder fitted into the shaft hole with the gap therebetween by tightening a tightening screw inserted through the slit.

9. The optical beam scanning apparatus according to claim 8,
   wherein the tightening screw is provided in an upper portion of the fixing mechanism.

10. The optical beam scanning apparatus according to claim 1,
    wherein the rotating holder is fixed by a screw and mounted on the holder base through a pressing member.

11. The optical beam scanning apparatus according to claim 10,
    wherein the pressing member is configured to be a leaf spring or a compressing spring.

12. The optical beam scanning apparatus according to claim 1,
    wherein the center of the shaft of the rotating holder is configured to coincide with the center of an edge line of the sensor.

13. The optical beam scanning apparatus according to claim 1,
    wherein the deflection optical system is mounted on the same plate which is integrally detachable.

14. The optical beam scanning apparatus according to claim 1,
    wherein at least one sensor is mounted on the same plate which is integrally detachable.

15. An image forming apparatus having an optical beam scanning apparatus comprising:
    a body housing;
    a light source configured to emit one or plural light fluxes;
    a pre-deflection optical system configured to give a predetermined characteristic to the light flux emitted from the light source;

an optical beam deflecting device configured to deflect the light flux, which is given with the predetermined characteristic by the pre-deflection optical system, to a scanned object by means of reflection in a main scanning direction;
a sensor configured to detect a portion of the light flux deflected by the optical beam deflecting device;
a holder base fixed to the body housing by a screw;
a rotating holder attached to the holder base and provided with a shaft;
a sensor substrate fixed to the rotating holder by a screw, the sensor being fixed to the sensor substrate;
a rotation adjusting mechanism configured to rotationally adjust the rotating holder around the shaft with respect to the holder base; and
a fixing mechanism configured to fix the rotating holder to the holder base.

* * * * *